March 26, 1940.   H. B. BERNAY   2,195,045
PRUNING IMPLEMENT
Filed Nov. 27, 1937   2 Sheets-Sheet 1
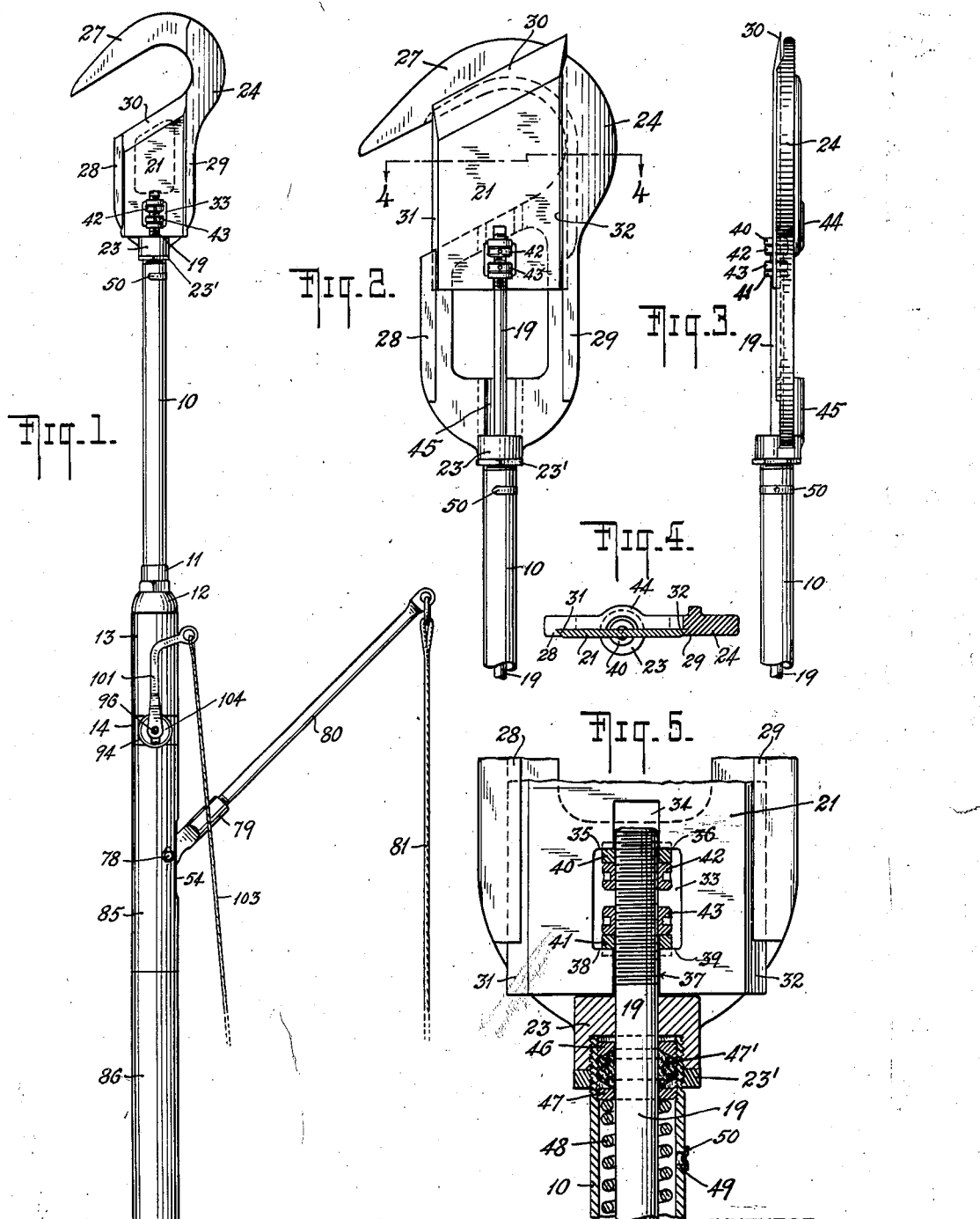
WITNESS
G. V. Rasmussen
INVENTOR
HENRI B. BERNAY
BY
ATTORNEYS

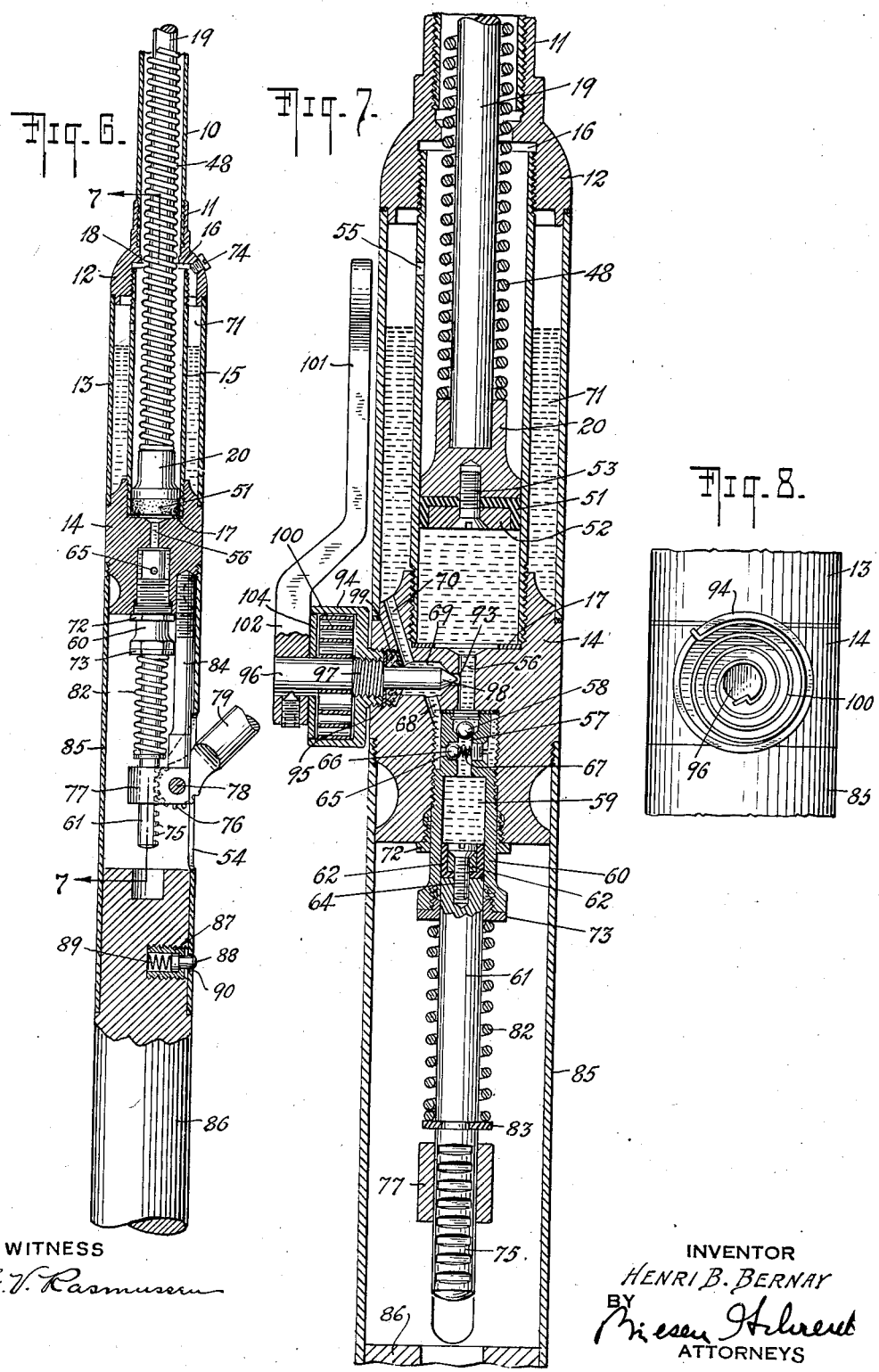

Patented Mar. 26, 1940

2,195,045

UNITED STATES PATENT OFFICE 2,195,045

PRUNING IMPLEMENT

Henri B. Bernay, New York, N. Y.

Application November 27, 1937, Serial No. 176,803

9 Claims. (Cl. 30—243)

This invention relates to devices for pruning trees or shrubbery and has for its principal object the provision of a hand-operable pruning implement which will be capable of cutting through relatively large limbs with the exercise of a minimum effort by the operator.

Broadly speaking the invention contemplates a pruning implement having the cutting knife thereof connected to and controlled by hydraulic means capable of multiplying the power or effort exerted by the operator sufficiently to enable the latter to cut tree limbs of from two to eight inches in thickness from the ground and it is believed that the implement of this invention is the first one capable of such performance. The device of the invention is simple, compact and relatively light in weight and the parts of which it is composed are so arranged and constructed that injury to any of them through possible mishandling is prevented. The invention also includes means which are operable to return the hydraulically operated cutting blade back into its initial position after severing of a branch has been accomplished, so that the implement is ready for use immediately upon another branch. Another feature of the invention is concerned with a novel means for mounting the cutting blade whereby ready adjustment and replacement thereof is effected.

Other objects and advantages of the invention as well as the novel details in the construction, arrangement and combination of parts will become apparent after a study of the following description, taken in connection with the accompanying drawings, in which Fig. 1 is a front elevation of my novel pruning implement; Fig. 2 is an enlarged detailed view of the cutting head and the upper portion of the support therefor; Fig. 3 is side view of the mechanism shown in Fig. 2; Fig. 4 is a section taken along the line 4—4 of Fig. 2; Fig. 5 is an enlarged detailed view, partly in section, of the cutting head and support therefor; Fig. 6 is an enlarged detail, partly in section, of the mechanism for operating the cutting knife; Fig. 7 is an enlarged detail view taken along the line 7—7 of Fig. 6 and Fig. 8 is an enlarged front view of a detail.

In the drawings, in which similar reference characters identify similar parts in the several views, the numeral 10 indicates a metal tube having at its lower extremity an external male thread which threadedly engages with an internal female thread provided in the tubular portion 11 of a metal cylinder head 12. A metal cylinder 13 connects the head 12 with a valve housing 14 which also serves as a closure for the chamber 71 provided between the cylinder 13 and an internally disposed concentric cylinder 15. As is shown more clearly in Figs. 7 and 8, the cylinder 15 is externally threaded at both ends and is in threaded engagement with the side walls of the opposing interior annular recesses provided in the cylinder head 12 and the valve housing 14. A liquid tight joint is made between the upper end of the cylinder 15 and the head 12, an air vent 16, however, being provided between the interior of the head 12 and the chamber 71. A packing ring seals the joint between the lower end of the cylinder 15 and the shoulder 17 of the valve housing 14.

The tube 10 is in communication with the cylinder 15 through an annular opening 18 provided in the head 12, and disposed in the tube 10 and cylinder 15 which are positioned in axial alignment is a rod 19 having attached at its lower extremity a piston 20 and having attached at its upper end a cutting knife 21. The upper end of the tube 10 from which the rod 19 projects is internally and externally threaded, the external threads 22 thereof being in threaded engagement with the internally threaded lower annular portion 23 of a cutting head or fixture 24 which caps the tube 10 and through which the rod 19 extends. A lock nut 23' holds the head 24 in position.

The cutting head or fixture 24 comprises a body, preferably constructed of steel, terminating in a hooked end 27. Such hooked end is preferably constructed to have its nose extend outwardly beyond the edge of the body of the head, so that the implement, in operation may be brought to a position above the branch to be severed and then dropped so as to have the nose of the hook engage the branch. This construction is preferable as it eliminates the necessity of exactly positioning the hook adjacent a branch and then moving it sidewise to engage the same. The body of the head is provided with a pair of longitudinally extending raceways 28 and 29 within which is slidably mounted the knife 21 having a cutting edge 30 and having its sides suitably bevelled as at 31 and 32 to slide smoothly in the raceways 28 and 29.

The cutting edge 30 of the knife is disposed at an angle, as is shown more clearly in Fig. 2, whereby an even, smooth, clean severing of the branch is accomplished as the knife is moved towards the hooked end 27. The knife 21 is made from a flat piece of specially good tool steel and is provided at its lower end with a vertically disposed slot having a centrally disposed enlarged portion 33, an upper restricted portion 34 to provide the pair of spaced supporting shoulders 35 and 36 and a restricted opening 37 to provide the pair of spaced supporting shoulders 38 and 39. As is shown more clearly in Figs. 1 to 3 and especially the latter, the upper end of the rod 19, which is threaded, extends up through the portions 37 and 33 of the slot and into the restricted portion 34 thereof. Disposed in the enlarged portion 33 of the slot and mounted on said rod, are a pair of washers 40 and 41 having slotted outer faces, the slot of the washer 40 saddling the pair of spaced supporting shoulders 35 and 36 and the slot of the washer 41 saddling the pair of spaced supporting shoulders 38 and 39. A pair of spaced nuts 42 and 43 are disposed intermediate the washers 40 and 41 and threadedly engage with the rod 19, the nut 42 securely holding the washer 40 in saddled position on the shoulders 35 and 36, and the nut 43 engaging and securely holding the washer 41 in saddled position on the shoulders 38 and 39. This construction affords a tight, solid connection between the rod 19 and the knife 21 and yet at the same time enables the knife to be readily adjusted and removed, it being readily apparent that the latter may be accomplished by simply adjusting the nuts 42 and 43 on the rod 19 until the knife is properly positioned for a satisfactory cutting action. When it is desired to replace or to sharpen the knife, the nut 43 is screwed up in the rod 19 against the nut 42 and then the two nuts are screwed upwardly to force the knife off the rod. The cutting head 24 is arcuately formed at 44 to permit of this operation and to prohibit any hindrance to the washers and nuts during sliding action of the knife. The cutting head 24 is also grooved at 45 to permit free sliding of the knife with respect thereto during the operation of the device. When the knife is in its normal or at-rest position the lower edge thereof abuts against the top surface of the annular portion 23 of the cutting head as is shown in Fig. 3.

A liquid tight joint is obtained between the rod 19 and the metal tube 10 at the upper end of the latter by means of the spaced packing washers 46 and 47 which threadedly engage with the interior threads provided on the upper end of such tube and the packing material 47' compressed therebetween. Surrounding the rod 19 is a coiled compression spring 48, the upper end of which engages with the packing washer 47 and the lower end of which rests upon the upper surface of the piston 20. A close fit of the piston 20 within the cylinder 15 is obtained by means of the flanged leather washer 51 whose downwardly extending flange is maintained in snug contact against the interior wall of such cylinder by means of the washer 52 which forms the face of the piston and is secured to the piston by means of a screw 53. An air vent 49 is provided in the tube 10 and is normally closed by the spring clamp 50 which embraces such tube.

The upper portion of the valve housing 14 is provided with a passageway 56 which communicates at its upper end with the cylinder 14 and at its lower end with a valve port whose bore 57 is normally closed by means of the ball check valve 58. The bore 57 communicates at its lower end with the cylindrical chamber 59 formed in the body 60 of the valve. The chamber 59 is closed by a piston formed at the upper end of the rod 61, such piston consisting of a flanged leather washer 62 and a washer 63 contained within the upwardly extending flange of the washer 62 and secured to the rod 61 by means of a screw 64. Intermediate the ends of the bore 57 is a valve port 65 which is normally closed by the ball valve 66 under the tension of a spring 67. The port 65 affords communication between the bore 57 and a passageway extending upwardly through the valve housing and consisting of a lower portion 68, an intermediate enlarged and horizontally disposed portion 69 and an upper portion 70 which communicates with the chamber or reservoir 71 formed between the cylinders 13 and 15. It will be immediately apparent, that the fluid, such as oil, from the reservoir 71 will flow down the portions 70, 69 and 68 of the feed passageway and when the piston on the end of the rod 61 is withdrawn so that the ball valve 66 may be displaced, will flow through the port 65 and into the chamber 59. On the upward stroke of such piston, the pressure of the fluid will close the ball valve 66 and force the ball valve 58 away from its seat, the fluid then passing into the cylinder 15 and raising the piston 20. When the piston on the end of the rod 61 reaches the end of its stroke, the pressure of the fluid within the cylinder 15 will tightly seat the ball valve 58 and close communication to the bore 57. On the downward stroke of the piston rod 61 the ball valve 66 will be again moved from its seat to allow the fluid to flow into and fill the space provided in the chamber 59 by the retreating piston. An open port 55 connects the cylinder 15 with the reservoir 71 at a point which corresponds to the limit of upward movement of the knife 21 and prevents damage to the parts by the inadvertent pumping of an excess amount of the oil into the cylinder 15, any oil in excess of the amount required to sever the branch being pumped back into the reservoir through such open port 55. Packings are provided at 72 and 73 to insure a liquid tight fit between the valve housing 14 and the valve body 60 and between the valve body 60 and the piston rod 61. A refill opening which is normally closed by a screw cap 74 is provided in the head 12 to enable the replenishing of oil in the reservoir 71 whenever necessary.

The lower end of the rod 61 has integrally formed therewith a rack 75 which is arranged to mesh with the teeth of a pinion 76 mounted between the spaced ends of a U-shaped bracket 77 by means of a pin 78. The pinion 76 is formed integrally with a lever 79 extending therefrom and upon which is secured the handle 80, the latter of which has connected thereto a rope 81. Upon the downward movement of the handle 80, as by a pull on the rope 81, the pinion 76 is rotated about its pin 78, causing movement of the rack 75 upwardly and thereby causing the piston on the rod 61 to advance upwardly in the chamber 59 thereby forcing the fluid in such chamber into the cylinder 15 as hereinabove explained. The piston rod 61 and the rack 75 are returned to their lowermost position after each upward stroke thereof by means of the compression spring 82 which is coiled about such rod and seats at its upper end against the valve housing packing nut 73 and at its lower end upon an annular washer 83 secured to the rod 61 just above the bracket 77. The closed end of the bracket 77 within which the rack 75 moves, prevents any play in the rack during its movements and insures the raising of such rack by the pinion 76. The bracket 77 is supported by a depending rod 84 which is secured at its upper end in the valve housing 14 and is adjustable with respect thereto.

The rod 61 and its associated mechanism is housed within a sleeve 85 which is secured at its upper end to the valve housing 14 and at its lower end encircles the upper end of wooden handle 86 which may be made of one piece or with a plurality of sections. Detent means are provided for holding the sleeve 85 on the handle 86. As is shown in Fig. 6, this means comprises a tubular member 87 screwed into a cavity provided in the handle 86, a detent member 88 which is normally urged to its outermost position by means of a spring 89 and an aperture 90 in the sleeve 85 with which the detent member is adapted to engage when the aperture is in alignment therewith. The sleeve 85 is provided with a longitudinally extending slot 54 through which extends the lever 79 and which is of sufficient length so as not to interfere with the working of the stem 79.

The oil which has been pumped into the cylinder 15 to move the knife upwardly towards the hooked portion 27 of the cutting head is released therefrom by hand operable means, to enable the knife to return immediately to its starting position for the cutting of another branch. This means includes a needle valve unit which is supported by the valve housing 14 and which normally closes a port 93 connecting the passageway 56 with the horizontally disposed enlarged portion 69 of the feed line from the reservoir 71 to the chamber 59. As is shown more clearly in Fig. 7 the valve unit comprises a housing 94 having a hub provided with a right-hand thread which threadedly engages with a female thread provided on the interior surface of an open annular recess 95 communicating at its inner end with the enlarged portion 69 of the feed line. Extending through the housing 94 is a valve member consisting of an outer stem portion 96; an intermediate threaded portion 97 and an inner valve portion 98. The needle valve portion 98 thereof projects from the interior end of the hub of the housing 94, extends through the enlarged portion 69 of the feed line and normally closes the port hole 93. As is shown in Fig. 7 the needle valve portion has a cross-sectional area less than that of the enlarged portion 69 of the feed line so that it does not interfere with the flow of the fluid from the reservoir 71 to the chamber 59. The intermediate portion 79 of the valve member is provided with a left hand thread which threadedly engages with a female thread provided on the interior surface of the hub of the housing 94 so that when the valve member is rotated in a clockwise manner it will be caused to move outwardly relative to the valve housing 14 thereby opening the port 93 and allowing the fluid which has been pumped into the cylinder 15 to flow through such port into the enlarged portion 69 of the feed line, up the portion 70 of the feed line and into the reservoir 71. The spring 48 which has been placed under tension by the fluid pumped into the cylinder 15 will assist in forcing the fluid from such cylinder and will retract the knife 21 from its advanced position as the fluid empties from the cylinder 15. A packing 99 is provided in the recess 95 between the hub of the housing 94 and the inner end of such recess to prevent leakage of the oil at this point.

The stem portion 96 of the valve member which extends through the housing 94 is surrounded by a flat spiral spring 100, the inner end of which is attached to the stem portion 96 and the outer end of which is attached to the wall of the housing 94, as is more clearly shown in Fig. 8. The spring 100 is so arranged with respect to the valve member and housing, that it exerts a counterclockwise tension on the former to keep the needle valve portion 98 thereof tightly against the port 93 but may be wound up to enable the valve portion 98 to be withdrawn from such portion. The means for withdrawing the valve member from the port 93 against the tension of the spring 100 consists of an actuating angularly-shaped handle 101 provided with a hub portion 102 which encloses the projecting end of the stem portion 96 of the valve member and is securely attached to the latter by means of a set-screw. The outer end of the handle 101 has attached thereto a rope or cord 103 which may be pulled by the operator on the ground to rotate the handle 101 and the valve member in a clockwise direction against the tension of the spring 100 to open the port 93. When the operator releases the cord 103 the spring 100 which is sufficiently strong to work against the weight of the handle and the frictional resistance of the cooperating parts connected thereto, will return the handle and valve member to their normal positions thereby again closing the port 93. A cover plate 104 having a diameter slightly less than the interior diameter of the housing 94 is attached to the stem portion 96 of the valve member and serves to keep dirt and grit from getting into the housing 94.

In the operation of my novel pruning implement, the hooked end of the cutting head is brought over the branch to be severed and the operator pulls down the handle 80, or, in case the branch is in the upper reaches of a tree, the rope 81. The downward movement of the handle 80 which carries the pinion 76, causes the rack 75 and consequently the rod 61 integrally formed therewith to move upwardly, the upward movement of the piston formed on the upper end of such rod, as has been previously explained, forcing the fluid which has collected in the chamber 59, up through the bore 57, past the ball valve 58, through the passageway 56 and into the cylinder 15 to displace the piston 20 in such cylinder by the amount of oil forced into such cylinder. The piston 20 which has thus been moved upwardly against the tension of the spring 48 raises the rod 19 and consequently the knife 21 attached to the upper end of the latter. Upon completion of the downward stroke of the handle 80, the operator allows it to return to its initial position. This is accomplished by means of the spring 82 which has been compressed during the upward movement of the rod 61 and now that the pressure on the handle 80 is released, forces the rod 61 and rack 75 downwardly thereby causing the handle 80 through its pinion connection with the rack 75 to be raised. The downward movement of the rod 61 again allows fluid from the reservoir 71 to pass through the portions 68, 69 and 70 of the feed passageway, past the ball valve 66 and into the chamber 59, as has been previously explained. The successive operations of moving the handle 80 downwardly are repeated until the piston 20 in the cylinder 15 has been moved upward sufficiently to cause the cutting knife 21 to pass entirely through the branch and effectively sever the same. This upward position of the piston 20 is defined by the port 55, any further oil which is pumped into the cylinder 15 after the piston 20 has passed above such port, being short-circuited through such port into the reservoir 71. This arrangement prevents the operator from pumping oil into the chamber 15 in such amount as to cause destruction of the parts operatively associated with the piston 20. After the branch has been severed, the knife 21, rod 19 and piston 20 are returned to their lowermost positions by operating the handle 101 downwardly in a clockwise direction against the tension of the spring 100. This operation causes the needle valve portion 98 of the valve member to be withdrawn from the port 93, thereby allowing the fluid which has been pumped into the cylinder 15 and is under great pressure, to flow through the port 93 and up through the feed passageway into the reservoir 71. The spring 48 surrounding the rod 19 is of sufficient strength to force the piston 20 downwardly when the port 93 has been opened thereby assisting in the emptying of the cylinder 15 and returning the piston 20 and knife 21 to their lowermost positions where the knife will be again in position for the cutting of another limb.

It is manifest from the foregoing that I have provided a very simple, compact pruning device which will be efficient in operation and which will be capable of multiplying the effort exerted by the operator to a sufficient extent to cut through relatively large limbs of the order of from two to eight inches in diameter and constituted of very hard wood such as hickory or oak. While in the foregoing specification and the accompanying drawings, I have described and shown the preferred form of my invention, it will be apparent that various changes in the arrangement and construction of the parts may be made without departing from the spirit of the invention or the scope thereof as defined by the appended claims whose purpose it is to include and embrace any such modifications or equivalents.

I claim:

1. A pruning implement comprising a metallic tube, a cutting head attached to the upper end of said tube, a knife blade slidably mounted in said head and provided at its lower end with a vertically disposed slot having a restricted opening to provide a pair of spaced supporting shoulders, a rod extending through said tube and into said slot, a pair of washers having slotted outer faces mounted on said rod and disposed in the enlarged portion of said slot, the upper washer saddling the upper end of said slot and the lower washer saddling the pair of spaced supporting shoulders, a pair of spaced nuts disposed intermediate said washers and threadedly engaging with said rod, said nuts engaging with said washers and securely holding them in saddled position in the slot, and hand operable means for actuating said rod to operate said knife.

2. A pruning implement comprising a metallic tube, a cutting head attached to the upper end of said tube, a knife blade slidably mounted in said head and provided at its lower end with a vertically disposed slot having an enlarged central portion, an upper restricted portion to provide a pair of spaced supporting shoulders, and a restricted opening to provide a second pair of spaced supporting shoulders, a rod extending through said metallic tube and into said slot, the upper end of said rod extending into the upper restricted portion of said slot, a pair of washers having slotted outer faces mounted on said rod and disposed in the enlarged portion of said slot, the upper washer saddling the pair of spaced supporting shoulders formed by the upper restricting portion and the lower washer saddling the pair of spaced supporting shoulders formed by the restricted opening, a pair of spaced nuts disposed intermediate said washers and threadedly engaging with said rod, said nuts engaging with said washers and securely holding them in saddled position in the slot, and hand operable means for actuating said rod to operate said knife.

3. In a pruning implement the combination of an elongated handle adapted to be grasped by the operator, a self-contained operating unit mounted on the upper end of said handle, said unit including a pair of cylinders disposed one above the other, the upper cylinder being materially larger than the lower cylinder and extending longitudinally of the implement so as to be vertically disposed in the functioning of the implement, a piston slidable in said upper cylinder, a cutting blade connected to upper end of said piston, a cutting head adapted to slidably receive said blade, a spring normally urging said piston to the bottom of said cylinder to hold said cutting blade in retracted position, a plunger slidable in said lower cylinder, a liquid reservoir disposed above said lower cylinder and surrounding said upper cylinder, means including a valve for enabling said plunger to draw liquid from said reservoir into said lower cylinder and to force it therefrom into said upper cylinder to operate said piston step-by-step to actuate said cutting blade, means operable to actuate said plunger, spring means normally urging said plunger to retracted position and said operable means to starting position, means operable to permit flow of the liquid from said upper cylinder into said reservoir to allow return movement of said piston and the retraction of said cutting blade, and spring means for normally urging said last-mentioned means to starting position.

4. In a pruning implement, the combination of an elongated handle adapted to be grasped by the operator, a self-contained operating unit mounted on the upper end of said handle, said unit including a pair of cylinders disposed one above the other, the upper cylinder being materially larger than the lower cylinder and extending longitudinally of the implement so as to be vertically disposed in the functioning of the implement, a piston slidable in said upper cylinder, a cutting blade connected to the upper end of said piston, a spring normally urging said piston to the bottom of said cylinder to hold said cutting blade in retracted position, a plunger slidable in said lower cylinder, a liquid reservoir cylinder disposed above said lower cylinder and surrounding said upper cylinder, means including a valve for enabling said plunger to draw liquid from said reservoir into said lower cylinder and to force it therefrom into said upper cylinder to operate said piston step-by-step to actuate said cutting blade, means including a pivoted lever for actuating said plunger, spring means normally urging said plunger to retracted position and said lever to starting position, valve means including a rotatable control element to permit flow of liquid from said upper cylinder into said reservoir to allow return movement of said piston and the retraction of said cutting blade, and spring means normally urging said valve means to closed position and said rotatable element to starting position.

5. In a pruning implement the combination of an elongated handle adapted to be grasped by the operator, a self-contained operating unit mounted on the upper end of said handle, said unit including a pair of cylinders extending longitudinally of the implement so as to be vertically disposed in the functioning of the implement, the upper cylinder being materially larger than the lower cylinder and having a piston slidable therein, a cutting blade connected to the upper end of said piston, a spring normally urging said piston to the bottom of said cylinder to hold said cutting blade in retracted position, a plunger disposed in axial alignment with said piston and slidable in said lower cylinder, a liquid reservoir cylinder disposed above said lower cylinder and surrounding said upper cylinder, means disposed intermediate said cylinders for enabling said plunger to draw liquid from said reservoir into said lower cylinder and to force it therefrom into said upper cylinder to operate said piston step-by-step to actuate said cutting blade, means including a lever adapted to be moved downwardly for actuating said plunger, spring means normally urging said plunger downwardly to retracted position and said lever upwardly to starting position, valve means including a lever adapted to be moved downwardly to permit flow of the liquid from said upper cylinder into said reservoir to allow return movement of said piston and the retraction of said cutting blade, and spring means normally urging said valve means to closed position and said second-mentioned lever upwardly to starting position.

6. In a pruning implement the combination of an elongated handle adapted to be grasped by the operator, a self-contained operating unit mounted on the upper end of said handle, said unit including a pair of cylinders disposed one above the other, the upper cylinder being materially larger than the lower cylinder and extending longitudinally of the implement so as to be vertically disposed in the functioning of the implement, a piston slidable in said upper cylinder, a cutting blade connected to the upper end of said piston, a spring normally urging said piston to the bottom of said cylinder to hold said cutting blade in retracted position, a plunger slidable in said lower cylinder, a valve housing disposed intermediate said cylinders and connecting the same, a liquid reservoir cylinder disposed above said valve housing and surrounding said upper cylinder, means in said valve housing for enabling said plunger to draw liquid from said reservoir into said lower cylinder and to force it therefrom into said upper cylinder to operate said piston step-by-step to actuate said cutting blade, means operable to actuate said plunger, spring means normally urging said plunger to retracted position and said actuating means to starting position, valve means mounted on said valve housing and operable to permit flow of the liquid from said upper cylinder into said reservoir to allow return movement of said piston and the retraction of said cutting blade, said valve means including a needle valve, a lever adapted to actuate said valve, and spring means to yieldingly resist movement of said lever during actuation of said valve and to normally urge said lever to its starting position.

7. In a pruning implement the combination of an elongated handle adapted to be grasped by the operator, a self-contained operating unit mounted on the upper end of said handle, said unit including a pair of cylinders disposed one above the other and connected in spaced relation to a valve housing disposed therebetween, the upper cylinder being materially larger than the lower cylinder and extending longitudinally of the implement so as to be vertically disposed in the functioning of the implement, a piston slidable in said upper cylinder, a cutting blade connected to the upper end of said piston, a spring normally urging said piston to the bottom of said cylinder to hold said cutting blade in retracted position, a plunger slidable in said lower cylinder, means operable to actuate said plunger, spring means normally urging said plunger to retracted position and said actuating means to starting position, a third cylinder mounted on the upper portion of said valve housing and surrounding said upper cylinder to form a liquid reservoir therebetween, means in said valve housing operable to enable said plunger to draw liquid from said reservoir into said lower cylinder and to force it therefrom into said upper cylinder, a fourth cylinder of substantially the same diameter as the third cylinder and disposed in spaced relation to the latter, said fourth cylinder being connected at its upper end to said valve housing and surrounding said lower cylinder, valve means including a rotatable control element mounted on said valve housing and operable to permit the flow of liquid from said upper cylinder into said reservoir to allow return movement of said piston and retraction of said cutting blade, and spring means for normally urging said valve means to closed position and said rotatable element to starting position.

8. In a pruning implement, the combination of an elongated handle adapted to be grasped by the operator, a self-contained operating unit mounted on the upper end of said handle, said unit including a pair of cylinders disposed one above the other, the upper cylinder being materially larger than the lower cylinder and extending longitudinally of the implement so as to be vertically disposed in the functioning of the implement, a piston slidable in said upper cylinder, a cutting blade connected to the upper end of said piston, a spring normally urging said piston to the bottom of said cylinder to hold said cutting blade in retracted position, a plunger slidable in said lower cylinder, a liquid reservoir cylinder disposed above said lower cylinder and surrounding said upper cylinder, means including a valve for enabling said plunger to draw liquid from said reservoir into said lower cylinder and to force it therefrom into said upper cylinder to operate said piston step-by-step to actuate said cutting blade, means operable to actuate said plunger, spring means normally urging said plunger to retracted position and said operable means to starting position, a passageway between said upper cylinder and said reservoir, a needle valve controlling said passageway, a rotatable element connected to said valve for operating the same, a casing enclosing a portion of said valve, and a spring surrounding that portion of said valve enclosed by said casing, one end of said spring being attached to said needle valve and the other end to said casing whereby said needle valve is normally maintained in closed position and said rotatable element in starting position, said spring yieldingly resisting movement of said rotatable element to open said needle valve.

9. In a pruning implement the combination of an elongated handle adapted to be grasped by the operator, a self-contained operating unit mounted on the upper end of said handle, said unit including a pair of cylinders, one of said cylinders being materially larger than the other cylinder and extending longitudinally of the implement so as to be vertically disposed in the functioning of the implement, a piston slidable in said larger cylinder, a cutting blade connected to the upper end of said piston, means normally urging said piston to the bottom of said cylinder to hold said cutting blade in retracted position, a plunger slidable in said smaller cylinder, a liquid reservoir arranged to feed liquid to said smaller cylinder and to receive liquid from said larger cylinder, means including a valve for enabling said plunger to draw liquid from said reservoir into said smaller cylinder and to force it therefrom into said larger cylinder to operate said piston step-by-step to actuate said cutting blade, means operable to actuate said plunger, resilient means normally urging said plunger to retracted position and said operable means to starting position, means operable to permit flow of the liquid from said larger cylinder into said reservoir to allow return movement of said piston and the retraction of said cutting blade, and means operable to return said last-mentioned means to its starting position after it has been actuated.

HENRI B. BERNAY.